Patented July 10, 1951

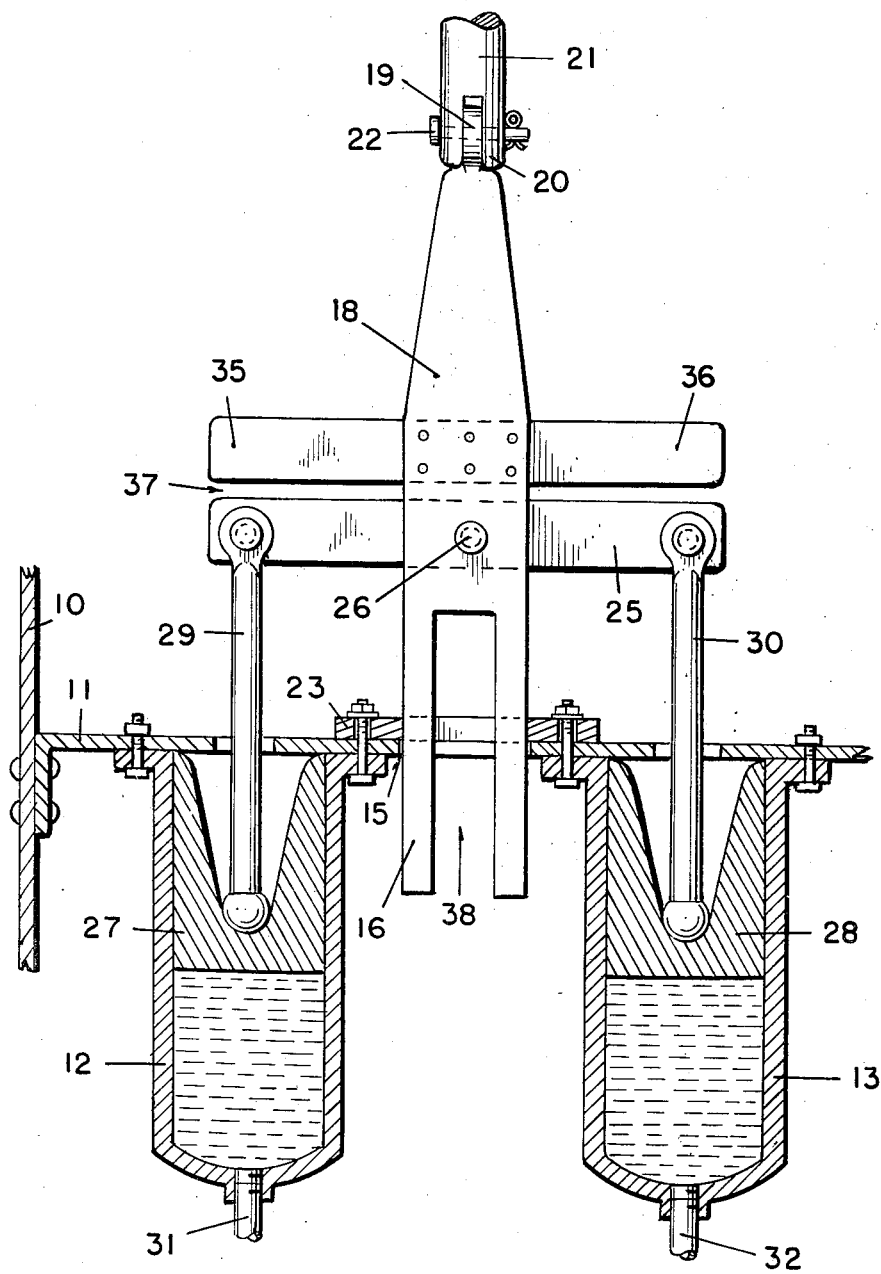

2,559,850

UNITED STATES PATENT OFFICE 2,559,850

HYDRAULIC BRAKE TWIN-CYLINDER COMPRESSOR

William L. Davis, Norfolk, Va., assignor of one-fourth to C. T. Saunders, Norfolk, Va.; Myrtle L. Davis administratrix of said William L. Davis, deceased Application June 24, 1949, Serial No. 101,159

2 Claims. (Cl. 188—204)

This invention relates to hydraulic brakes and has for its principal object the provision of a hydraulic brake twin cylinder compressor of extreme simplicity and sturdiness designed so that the pressure will be maintained on the front or on the rear brakes even in case the other set of brakes should get out of order as, for instance, by a leak in its hydraulic line.

A further object of the invention is to provide a push rod which carries a sturdy, positive stop member for preventing abnormal turning of the equalizing bar.

A still further object of the present invention is to provide a brake push rod leading from the foot pedal and provided with an extended bearing surface in a main or an auxiliary frame member, preferably the member which carries the twin cylinder compressor. The assembly can readily be applied to an existing structure.

In the drawings the figure represents a somewhat diagrammatic view of the invention.

To a side frame member 10 of the vehicle is mounted a cross bar 11 to which is secured the cylinder 12 controlling pressure to the front wheel brakes and the twin cylinder 13 controlling pressure to the rear wheel brakes. The cross member 11 has directly or indirectly an opening 15 which snugly receives the guiding end 16 of the brake push rod 18 which has at its front end a central lug 19 received in the clevis 20 of the lower arm 21 of the foot brake pedal lever and held by coupling pin 22. The plate 23 is very convenient for forming the bearing for the push rod 18 as by making a snug fit with this member exact adjustment may be had by slight movement of the plate until its bearing hole is in precise alinement with the desired movement of rod 18. In many models the plate or bracket 23 will be bolted directly to a frame member. The equalizing bar 25 is pivoted as at 26 to the rod 18 and is connected to the plungers 27 and 28 by the rods 29 and 30.

Equalizing rods of the general nature of member 25 are old but are used in pulling whereas in the present invention the equalizing bar is pushed inward and moves the plungers 27 and 28 equally, provided that everything is in normal condition. Obviously, if one line contains more hydraulic liquid than the other, one piston will move ahead of the other slightly and the equalizing bar will tilt about its pivot 26 so that the pressure is equal in the line 31 leading to the front wheel brakes and the similar line 32 leading to the rear wheel brakes.

A feature of my invention is the provision of a bumper stop consisting of a pair of wings 35 and 36 secured in any way to the brake push rod 18 and could well be integral with this member. The wings provide a certain amount of leeway 37 between them and the equalizing bar and permit tilting of the equalizing bar 25 to a degree to permit of any ordinary variation in pressure, for example $\tfrac{3}{16}''$. Should the tilt be excessive, however, the wing 35 or its corresponding member 36 would engage the equalizer bar 25 and prevent further movement and would thus insure that the vehicle is brought to a stop by the application of the brakes, this being true even if one line should be completely out of use. The bearing 15 in the frame member 11 guides the portion 16 of the brake push rod 18 and insures that the rod 18 and the pivot 26 moves constantly substantially perpendicularly to the frame member 11 and parallel to the sides of the cylinders 12 and 13. Preferably the guiding portion 16 is relatively wide compared to its thickness and if desired the central excess metal may be removed as at 38, leaving the portion in the form of a fork. The flat construction insures against rolling, shifting, or tilting of the equalizer bar 25 which is directly connected to the two plunger rods without the use of additional links.

In operation, the driver presses the usual brake pedal and this moves the arm 21 of the brake pedal lever in a rearward direction as the arm 21 is below the pivot of that lever and of which it is usually an integral part. The rearward movement moves the brake push rod 18 which is supported forwardly by the coupling pin 22 and rearwardly by the wide bearing 15 in the cylinder supporting bracket or bar 11, preferably in the plate 23. The equalizer bar 25 has an extensive flat bearing with the push rod 18 around its pivot 26 and since the push rod cannot roll, shift, or tilt with respect to support 11 the equalizer bar is likewise stabilized. Rearward movement of pivot tilts the equalizer bar very slightly under usual circumstances as one line 31 or 32 contains a slight bit more fluid than the other. Once the tilt is assumed the bar 25 and with it the two plungers 27 and 28 move rearwardly in perfect unison, maintaining the pressure in the two lines exactly equal. Should one line be out of order, broken, or deficient in fluid, the equalizer bar would engage the wing 35 or 36 and thus the line in good condition would receive its full pressure and the corresponding ground wheels of the vehicle would be effectively braked.

What I claim is:

1. In a hydraulic compressor assembly for use with a vehicle having a frame member with a laterally extended bearing, a pair of cylinders secured to said frame member in parallel relation, and a plunger in each cylinder: a push rod adapted to be connected to the usual foot brake pedal, an equalizing bar centrally pivoted to the push rod, and plunger rods directly pivoted to the ends of the equalizer bar and adapted to connect to the plungers in said cylinders, said push rod carrying means to limit the angle of tilt of the equalizer bar, the brake push rod having an extension projecting thru the bearing and snugly fitting same, said extended bearing and said extension having cooperating flat sides to prevent rolling, shifting or tilting.

2. An equalizing mechanism for use with a foot brake operated hydraulic compressor assembly including a pair of parallel cylinders and a plunger in each cylinder; a plunger rod pivoted to each plunger, means for transmitting power from the foot brake to the plungers parallel to the axes of the cylinders, including a member having a laterally extended flat guiding portion and a bar pivoted to the member and directly pivoted to both of the plunger rods; wings on the member extending at right angles thereto and spaced a slight distance from the mid-position of the bar to limit the angle of tilt of the bar, and an adjustable bracket rigidly positioned with respect to the cylinders and having a laterally extended bearing opening snugly receiving the flat guiding portion of the said member to prevent rolling, shifting or tilting.

WILLIAM L. DAVIS.

REFERENCES CITED

The following references are of record in the file of this patent:

UNITED STATES PATENTS

| Number | Name | Date |
|---|---|---|
| 1,453,098 | Frock | Apr. 24, 1923 |
| 1,786,912 | Madden | Dec. 30, 1930 |
| 2,131,459 | Weatherhead, Jr. | Sept. 27, 1938 |